United States Patent [19]

Arakawa

[11] Patent Number: 5,528,400
[45] Date of Patent: Jun. 18, 1996

[54] LIQUID CRYSTAL DISPLAY DEVICE HAVING NEGATIVE UNIAXIAL ANISOTROPIC FILM WITH INCLINED OPTICAL AXIS AND PROTECTIVE FILMS

[75] Inventor: Kohei Arakawa, Kanagawa, Japan

[73] Assignee: Fuji Photo Film Co., Ltd., Kanagawa, Japan

[21] Appl. No.: 487,680

[22] Filed: Jun. 7, 1995

[30] Foreign Application Priority Data

Jun. 8, 1994 [JP] Japan .................... 6-126521

[51] Int. Cl.$^6$ .................... G02F 1/1335
[52] U.S. Cl. .................... 359/73; 359/63
[58] Field of Search .................... 359/73, 63, 74, 359/93, 103, 500, 494; 428/1

[56] References Cited

U.S. PATENT DOCUMENTS

| | | | |
|---|---|---|---|
| 4,592,623 | 6/1986 | Yamamoto et al. | 359/63 |
| 4,813,770 | 3/1989 | Clerc et al. | 359/73 |
| 5,189,538 | 2/1993 | Arakawa | 359/73 |
| 5,375,006 | 12/1994 | Haas | 359/73 |
| 5,426,524 | 6/1995 | Wada et al. | 359/73 |

FOREIGN PATENT DOCUMENTS

| | | |
|---|---|---|
| 0576304 | 12/1993 | European Pat. Off. . |
| 0622656 | 11/1994 | European Pat. Off. .................... 359/73 |
| 3-9326 | 1/1991 | Japan . |
| 3-291601 | 12/1991 | Japan . |
| 5-215921 | 8/1993 | Japan . |
| 6-265728 | 9/1994 | Japan .................... 359/73 |

Primary Examiner—William L. Sikes
Assistant Examiner—Tai V. Duong
Attorney, Agent, or Firm—Burns, Doane, Swecker & Mathis

[57] ABSTRACT

A liquid crystal display device is composed of a liquid crystal cell having TN liquid crystal, a pair of polarizing plates arranged on both sides of the cell comprising a polarizer and a pair of protective films provided both sides of the polarizer and an optical compensatory sheet between the cell and the polarizing plate. The optical compensatory sheet comprises at least two optically anisotropic films having optically negative uniaxial property, one film having an optic axis in the direction of the normal of the film and other film having an optic axis in a direction inclined at 5–50 degrees from the normal, and the sum of retardation value of the film having an optic axis in the direction of the normal and retardation values of two protective films existing between the polarizers is from 100 to 400 nm.

7 Claims, 7 Drawing Sheets

5,528,400

LIQUID CRYSTAL DISPLAY DEVICE HAVING NEGATIVE UNIAXIAL ANISOTROPIC FILM WITH INCLINED OPTICAL AXIS AND PROTECTIVE FILMS

BACKGROUND OF THE INVENTION

1. Field of the Invention

The present invention relates to a liquid crystal display device provided with an optical compensatory sheet.

2. Description of Prior Art

As a display for electronic office system-devices such as a desk-top personal computer and a word processor, CRT (cathode ray tube) has been employed so far. Recently, a liquid crystal display (hereinafter referred to as LCD) is widely employed instead of the CRT because of its small thickness, light weight and low power consumption. LCD generally has a structure that a liquid crystal cell is disposed between a pair of polarizing sheets. Most of LCD use a twisted nematic (TN) liquid crystal. Operational mode of LCD using the twisted nematic liquid crystal is roughly divided into a birefringence mode and an optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such STN-LCD, therefore, has an advantage of giving display of a large volume by driving in time-sharing mode. However, the STN-LCD has disadvantages such as slow response (such as several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, twisted nematic liquid crystal showing a twisted angle of 90 degrees and having positive birefringence is employed for displaying an image. This is called LCD of an optically rotary mode (i.e., TN-LCD). TN-LCD display mode shows rapid response (such as several tens of milliseconds) and high display contrast, and easily gives black-white display of high contrast. Hence, the optical rotatory mode has a number of advantages compared with the birefringence mode or other modes. However, TN-LCD has disadvantages that color or contrast on display varies depending upon viewing angle to a liquid crystal display, and its display characteristics are not comparable to display characteristics of CRT.

In order to improve the viewing angle characteristics (i.e. to enlarge the viewable angle), arrangement of a phase difference film (optical compensatory sheet) between a pair of polarizing plates and TN liquid crystal cell is described in Japanese Patent Provisional Publications No. 4(1992)-229828 and No. 4(1992)-258923.

The optical compensatory sheets described in these publications show no optical effect when a liquid crystal display is viewed from the direction vertical to a screen of the display because phase difference in the direction perpendicular to a surface of the liquid crystal display is almost zero. The optical compensatory sheet serves for compensating phase difference (depending upon wavelengths of light) that occurs when the liquid crystal display is viewed from an oblique direction. The phase difference results in unfavorable viewing angle characteristics such as coloring of displayed image and narrow viewable angle.

It is known that the optical compensatory sheet is needed to have negative birefringenece for compensating positive birefringence of the twisted nematic liquid crystal and an inclined optic axis.

Japanese Patent Provisional Publication No. 6(1994)-75116 and EP0576304 A1 disclose an optical compensatory sheet having the negative birefringence and an inclined optic axis. In more detail, the disclosed sheet is prepared by stretching a polymer film such as a film of polycarbonate or polyester and has the directions of the main refractive indices which are inclined from the normal of the sheet. The preparation of the above-described sheet by the stretching treatment requires extremely complicated procedures. Therefore an optical compensatory sheet of a large surface area cannot be easily prepared according to the disclosed process.

Also known is an optical compensatory sheet comprising a liquid crystalline polymer. For instance, Japanese Patent Provisional Publications No. 3(1991)-9326 and No. 3(1991)-291601 disclose an optical compensatory sheet for LCD which is prepared by coating a solution of polymer showing liquid crystal property on an orientation layer provided on a support film. However, the polymer showing liquid crystal property is not satisfactorily oriented on the orientation layer. Further, the polymer does not generally show negative birefringence. Hence, the resulting compensatory sheet scarcely enlarges the viewing angle from all directions.

Japanese Patent Provisional Publication No. 5(1993)-215921 discloses the use of a birefringence plate (optical compensatory sheet) comprising a support and a polymerizable lod-like compound showing liquid crystal property and positive birefringence. The birefringence plate is prepared by coating a solution of the lod-like compound on the support and curing the compound under heating. The cured layer dose not show negative birefringence. Hence, the resulting compensatory sheet scarcely enlarges the viewing angle from all directions.

SUMMERY OF THE INVENTION

It is an object of the invention to provide a liquid crystal display device provided with an optical compensatory sheet which has an enlarged viewing angle and can be prepared by a relatively simple method.

There is provided by the invention a liquid crystal display device comprising a liquid crystal cell which comprises a pair of substrates provided with a transparent electrode and twist (twist-oriented) nematic liquid crystal sealed therebetween, a pair of polarizing plates arranged on both sides of the cell each of which comprises a polarizer and a pair of protective films provided both sides of the polarizer, and an optical compensatory sheet between the cell and the polarizing plate which is provided on one side or both sides of the cell;

wherein said optical compensatory sheet comprises at least two optically anisotropic films having optically negative uniaxial property, one film having an optic axis in the direction of the normal of the film and other film having an optic axis in a direction inclined at 5 to 50 degrees from the normal, and the sum of Re value of the film having an optic axis in the direction of the normal and Re values of two protective films existing between the polarizers is in the range of 100 to 400 nm. The Re value (i.e., retardation value) is defined by the formula:

$$Re=\{(nx+ny)/2-nz\}\times d$$

in which nx and ny are main refractictive indices on the plane and nz is a main refractive index in the thickness direction of the film.

Preferred liquid crystal display devices according to the invention are as follows:

1) The liquid crystal display device wherein said optical compensatory sheet is provided on both sides of the cell (in this case, the sum of Re values of the two films having an optic axis in the direction of the normal and Re values of two protective films existing between the polarizers is in the range of 100 to 400 nm).
2) The liquid crystal display device wherein the optically anisotropic film having an optic axis in a direction inclined at 5 to 50 degrees from the normal comprises a compound having a discotic structure unit.
3) The liquid crystal display device wherein the optically anisotropic film having an optic axis in a direction inclined at 5 to 50 degrees from the normal is prepared by casting a polymer solution on support to form a film, and giving shearing stress between both sides of the film.
4) The liquid crystal display device described above 3), wherein the sharing stress is given by squeezing the film between two rolls having peripheral speeds different from each other.
5) The liquid crystal display device wherein the optically anisotropic film having an optic axis in a direction inclined at 5 to 50 degrees from the normal comprises an optical isomerizable compound.
6) The liquid crystal display device wherein the optically anisotropic film having an optic axis in a direction inclined at 5 to 50 degrees from the normal comprises an optically anisotropic layer having a positive uniaxial property and an optic axis in a direction inclined from the normal and an optically anisotropic layer having the minimum of main refractictive indices in the thickness direction and the maximum of main refractictive indices in a plane of the layer, said two optically anisotropic sheets being arranged under the condition that the direction given when the direction inclined from the normal of the former anisotropic layer is orthographically projected on the layer is perpendicular to a direction of the maximum main refractive index of the latter anisotropic layer.
7) The liquid crystal display device wherein the protective film comprises triacetylcellulose.
8) The liquid crystal display device wherein the optically anisotropic films having an optic axis in the direction of the normal of the film is a transparent support having a light transmittance of not less than 80%.
9) The liquid crystal display device as described above 2) wherein the optical compensatory sheet has an orientation layer between the two optically anisotropic films.
10) The liquid crystal display device as described above 9) wherein the orientation layer is a polymer layer which has been subjected to rubbing treatment.
10) The liquid crystal display device as described above 9) wherein the orientation layer is prepared by obliquely depositing an inorganic compound on the support.

The liquid crystal display device of the invention has the optical compensatory sheet which comprises at least two optically anisotropic films having optically negative uniaxial property. One of the films has an optic axis in the direction of the normal of the film, which is generally used as a support of an optical compensatory sheet, and other has an optic axis in a direction inclined at 5 to 50 degrees from the normal of the film. Further, the device has a feature that the sum of Re value(s) of the optically anisotropic film(s) having an optic axis in the direction of the normal and Re values of the two protective films existing between the polarizers is in the range of 100 to 400 nm.

The liquid crystal display device having the above structure and feature gives a greatly enlarged viewing angle, and is almost free from reversion of black-and-white image or gradation, and coloring of a displayed image. The reason is assumed as follows: the inclined angle of the latter optically anisotropic film and the specific Re values of the former optically anisotropic film(s) and the protective films compensates the phase difference produced by orientation of the liquid crystal having positive birefringence of the liquid crystal cell on application of voltage.

DETAILED DESCRIPTION OF THE INVENTION

The liquid crystal display device has a basic structure comprising a liquid crystal cell, a pair of polarizing plates arranged on both sides of the cell and an optical compensatory sheet between the cell and the polarizing plate which is provided on one side or both sides of the cell.

In the invention, the optical compensatory sheet comprises at least two optically anisotropic films having optically negative uniaxial property. One of the films has an optic axis in the direction of the normal of the film, and other has an optic axis in a direction inclined at 5 to 50 degrees from the normal of the film. Further, the sum of Re value(s) of the optically anisotropic film(s) having an optic axis in a direction of the normal and Re values of the two protective films existing between the polarizers is in the range of 100 to 400 nm. The Re value is defined as the formula:

$$Re=\{(nx+ny)/2-nz\}\times d$$

in which nx and ny is main refractictive indices within the plane and nz is a main refractive index in a thickness direction of the film.

The optically negative uniaxial (monoaxial) property means property which satisfies the condition of:

$$n_\alpha < n_\beta = n_\chi$$

in which $n_\alpha$, $n_\beta$ and $n_\chi$ are refractive indices in the three axes directions of an optically anisotropic element or a protective film However, $n_\beta$ and $n_\chi$ are not required to be strictly equal to each other and it will be satisfied that they are approximately equal to each other. In more detail, there is no problem in practical uses, as long as the negative uniaxial property satisfies the condition of:

$$|n_\beta - n_\chi|/|n_\beta - n_\alpha| \leq 0.2$$

Figure 1:
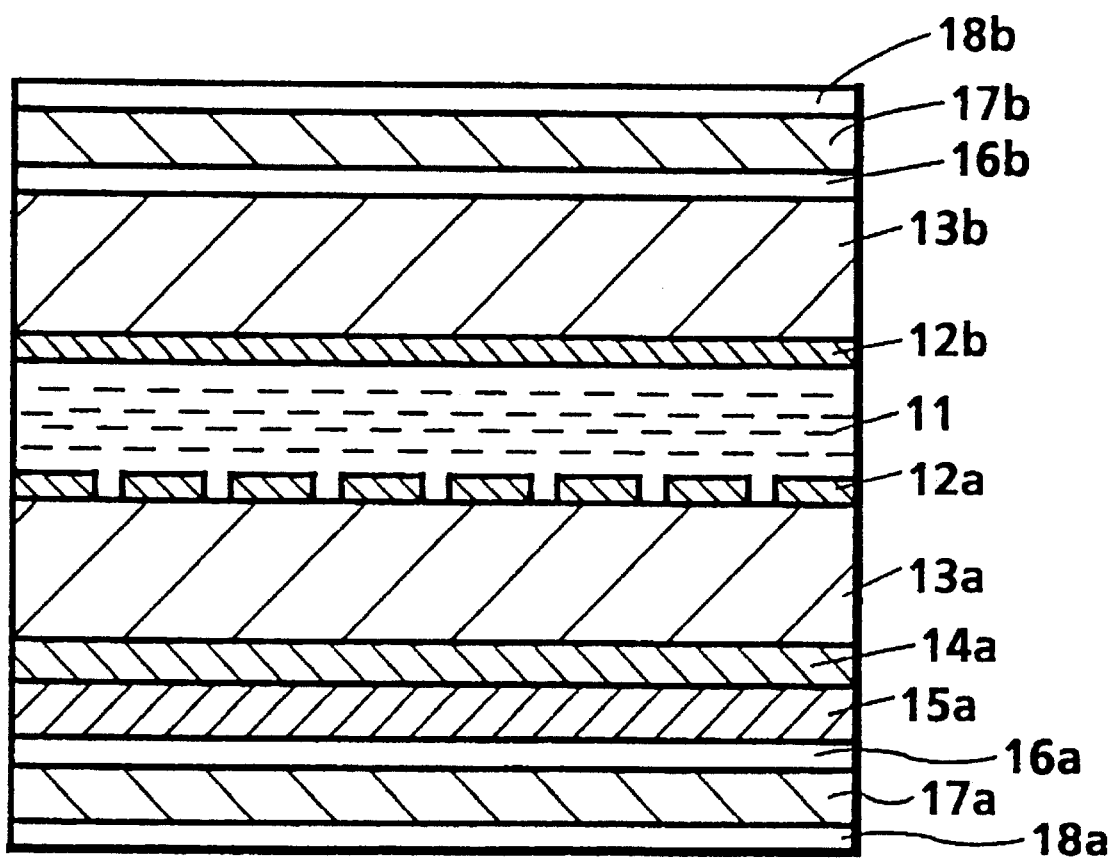
FIG. 1 is a view schematically showing a representative structure of the liquid crystal display device of the invention.

A representative structure of the liquid crystal display device of the invention is shown in FIG. 1. The liquid crystal display device is composed of a liquid crystal cell comprising a pair of substrates 13a, 13b provided with transparent electrodes 12a, 12b and a twist-oriented nematic liquid crystal 11 sealed therebetween, a pair of polarizing plates arranged on the both sides of the cell wherein one of the polarizing plates comprises a polarizer 17a and protective films 16a and 18a on both sides of the polarizer and the other comprises a polarizer 17b and protective films 16b, 18b on both sides of the polarizer, and the optical compensatory sheet between the liquid crystal cell and the polarizing sheet which comprises an optically anisotropic films 15a, 14a. The optically anisotropic film 15a has an optically negative uniaxial property and an optic axis in the direction of the normal of the film, and the optically anisotropic element 14a has an optically negative uniaxial property and an optic axis in a direction inclined at 5 to 50 degrees from the normal of the film. The optically anisotropic films 15a, 14a can be arranged in reverse order. Further, one of the optically anisotropic films having an optically negative uniaxial property may be provided between the substrate and the protective film adjacent to the cell.

In the liquid crystal display device, the sum of Re values of the protective films 16a, 16b and the optically anisotropic film 15a is required to be in the range of 100 to 400 nm.

Figure 2:
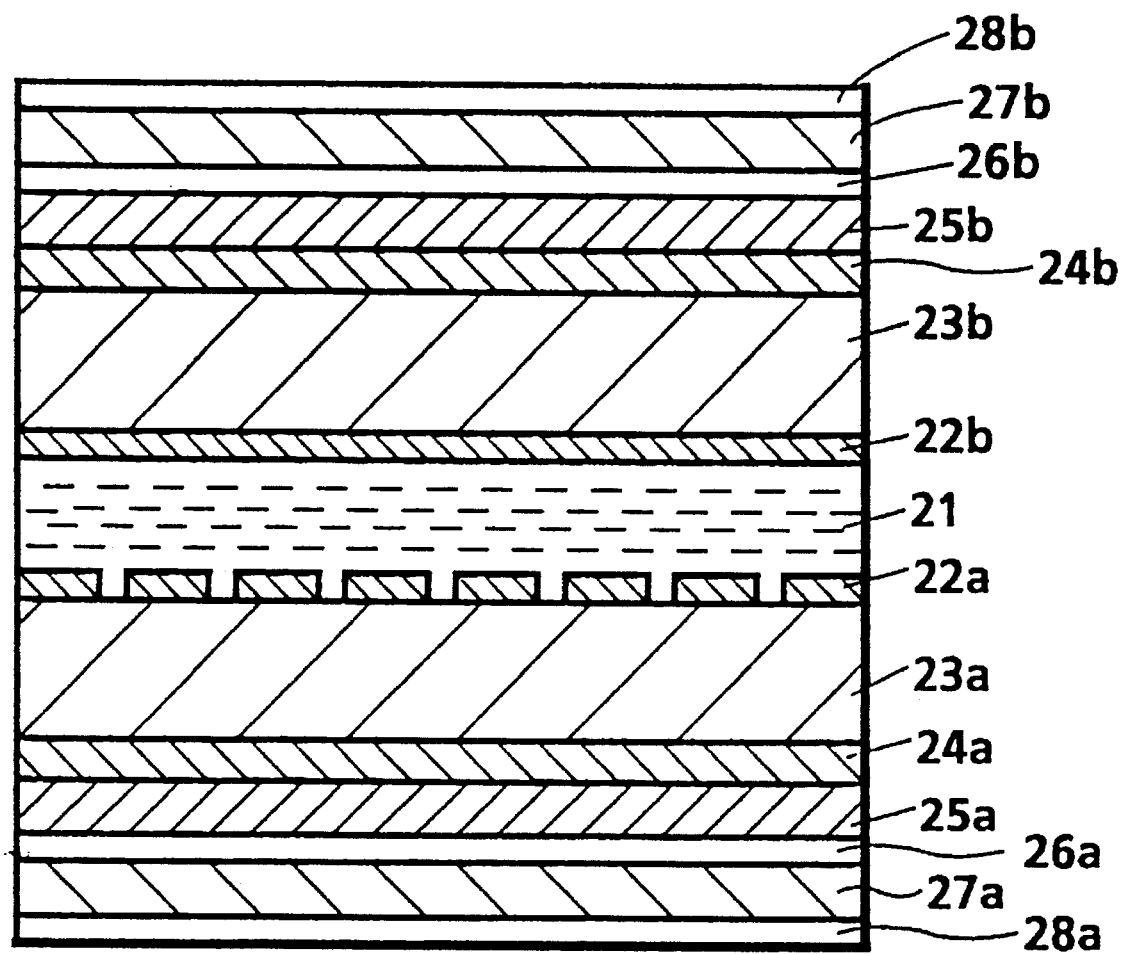
FIG. 2 is a view schematically showing another representative structure of the liquid crystal display device of the invention.

Another representative structure of the liquid crystal display device of the invention is shown in FIG. 2. The liquid crystal display device is composed of a liquid crystal cell comprising a pair of substrates 23a, 23b provided with transparent electrodes 22a, 22b and a twist-oriented nematic liquid crystal 21 sealed therebetween, a pair of polarizing plates arranged on the both sides of the cell wherein one of the polarizing plates comprises a polarizer 27a and protective films 26a, 28a on both sides of the polarizer and the other comprises a polarizer 27b and protective films 26b, 28b on both sides of the polarizer, and two optical compensatory sheets arranged between the substrate 23a and the protective film 26a and between the substrate 23b and the protective film 26b. One of the optical compensatory sheets comprises an optically anisotropic film 25a having an optically negative uniaxial property and an optic axis in the direction of the normal of the film and an optically anisotropic film 24a having an optically negative uniaxial property and an optic axis in a direction inclined at 5 to 50 degrees from the normal of the film, and the other comprises an optically anisotropic film 25b having an optically negative uniaxial and an optic axis in the direction of the normal and an optically anisotropic element 24b having an optically negative uniaxial property and an optic axis in a direction inclined at 5 to 50 degrees from the normal. Further, one of the optically anisotropic films having an optically negative uniaxial property may be provided between the substrate and the protective layer adjacent to the cell.

In the liquid crystal display device, the total amount of Re values of the protective films 26a, 26b and Re values of the optically anisotropic elements 25a, 25b is required to be in the range of 100 to 400 nm.

Figure 3:
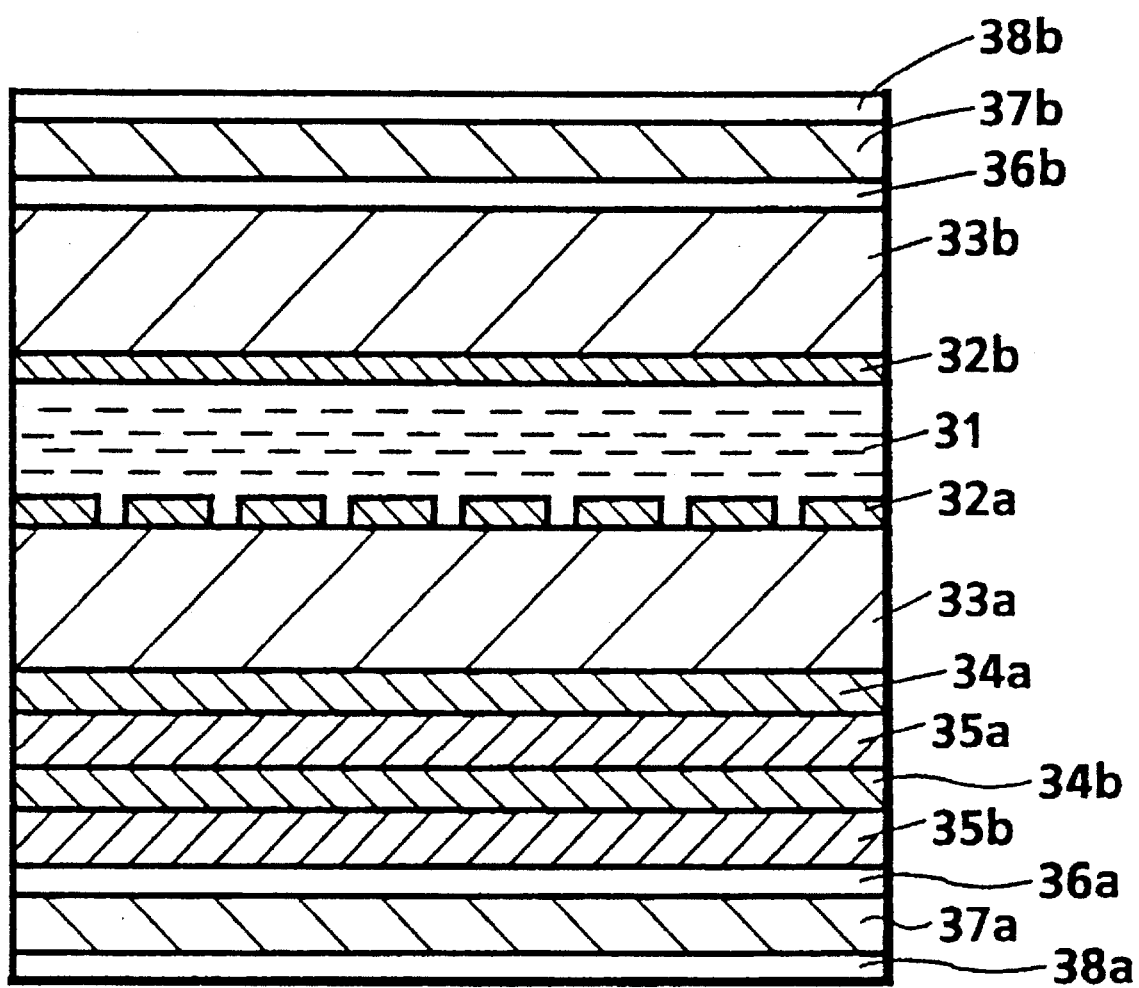
FIG. 3 is a view schematically showing other representative structure of the liquid crystal display device of the invention.

One of other representative structures of the liquid crystal display device of the invention is shown in FIG. 3. The liquid crystal display device is composed of a liquid crystal cell comprising a pair of substrates 33a, 33b provided with transparent electrode 32a, 32b and a twist-oriented nematic liquid crystal 31 sealed therebetween, a pair of polarizing plates arranged on the both sides of the cell wherein one of the polarizing plates comprises a polarizer 37a and protective films 36a, 38a on both sides of the polarizer and the other comprises a polarizer 37b and protective films 36b, 38b on both sides of the polarizer, and a composite of two optical compensatory sheets arranged between the substrate 33a and the protective film 36a. One of the optical compensatory sheets comprises an optically anisotropic film 35a having an optically negative uniaxial property and an optic axis in the direction of the normal and an optically anisotropic film 34a having an optically negative uniaxial property and an optic axis in a direction inclined at 5 to 50 degrees from the normal of the film, and the other comprises an optically anisotropic film 35b having an optically negative uniaxial property and an optic axis in the direction of the normal and an optically anisotropic element 34b having an optically negative uniaxial property and an optic axis in a direction inclined at 5 to 50 degrees from the normal. Further, one of the optically anisotropic films having an optically negative uniaxial property may be provided between the substrate and the protective layer adjacent to the cell.

In the liquid crystal display device, the total amount of Re values of the protective films 36a, 36b and Re values of the optically anisotropic elements 35a, 35b is required to be in the range of 100 to 400 nm.

The optically anisotropic film (e.g., 15a, 25a, 25b, 35a, 35b) having an optically negative uniaxial property and an optic axis in the direction of the normal of the film generally is a transparent support. The protective layer provided on the polarizer also has generally an optically negative uniaxial property and an optic axis in a direction of the normal of the film.

In the optically anisotropic film or the protective film which has an optically negative uniaxial property and an optic axis in the direction of the normal, the minimum of main refractictive indices is in a thickness direction of the film and other main refractictive indices are on a plane of the film. In more detail, the optically anisotropic film or the protective film satisfies the condition of nz<nx=ny in which nx and ny are main refractictive indices on the plane of the film and nz is a main refractive index in a thickness direction of the film. In practice, it is not required that nx is exactly equal to ny, and it is satisfactory that nx is almost equal to ny.

The optically anisotropic film or the protective film has an optic axis in a direction of the normal, and therefore |nx−ny| is approximately zero. In practice, the film generally satisfies the condition of:

$$0 \leq |nx-ny| \times d \leq 50 \text{ (nm)}$$

in which nx, ny and d have the same meanings as above, preferably satisfies the condition of:

$$0 \leq |nx-ny| \times d \leq 20 \text{ (nm)}$$

especially satisfies the condition of:

$$0 \leq |nx-ny| \times d \leq 10 \text{ (nm)}$$

Further, the sum of Re value(s) of the one or more optically anisotropic films and Re value(s) of the two protective films existing between the polarizers is required to be in the range of 100 to 400 nm (preferably 130 to 300 nm).

The Re value is defined as the formula:

$$Re = \{(nx+ny)/2 - nz\} \times d$$

in which nx, ny and nz have the same meanings as above. "nx", "ny", "nz" and "d" described above are shown in FIG. 4. "nx" and "ny" are main refractictive indices on the plane of the optically anisotropic film having an optic axis in a direction of the normal or the protective film, "nz" is a main refractive index in the thickness direction of the film, and d is the thickness of the film.

In order to obtain the display device having the sum of the Re values within the range of 100 to 400 nm, one or more optically anisotropic films are incorporated into the liquid crystal display device, as shown in FIGS. 1 to 3. In more detail, the optically anisotropic film is incorporated in the form of the optical compensatory sheet. Additional one or more optically anisotropic films are incorporated if necessary.

The liquid crystal display device of the invention shows a greatly enlarged viewing angle, and is almost free from reversion of black-and-white image or gradation, and coloring of a white displayed portion of a displayed image. When the sum of Re values is less than 100 nm, the display device shows reduced contrast at enlarged view angles. When the sum of Re value(s) exceeds 400 nm, coloring of a white displayed portion of a displayed image increases.

As material of the transparent support (i.e., the optically anisotropic film having an optically negative uniaxial property and an optic axis in the direction of the normal) of the invention, any material can be employed, so long as it is essentially transparent and has the above properties. The material preferably has a transmittance of not less than 80% and specially shows optical isotropy when it is viewed from a front side.

Therefore, the film is preferably prepared from material having a small intrinsic birefringence, such as triacetyl cellulose. Such material is available on market by the trade name of Geonex (from Nippon Geon Co., Ltd.), Arton (from Japan Synthetic Rubber Co., Ltd.) and Fuji TAC (from Fuji Photo Film Co., Ltd.). Moreover, materials having a large intrinsic birefringence such as polycarbonate, polyarylate, polysulfone and polyethersulfone can be also employed by rendering the materials optically isotropic by appropriately controlling molecular orientation in the procedure of forming a film.

The transparent film preferably satisfies the condition of:

$$20 \leq \{(nx+ny)/2 - nz\} \times d \leq 400 \text{ (nm)}$$

in which nx and ny is main refractictive indices on the plane of the film and nz is a main refractive index in the thickness direction of the film and d is the depth (i.e., thickness) of the film. More preferably, the transparent film satisfies the condition of:

$$30 \leq [(nx+ny)/2 - nz] \times d \leq 150$$

As materials for the protective film of the polarizing sheet (i.e., the optically anisotropic element which has an optically negative uniaxial property and an optic axis in a direction of the normal) of the invention, materials as employed for the transparent support are employable. The film is preferably prepared from material having a small intrinsic birefringence, such as triacetyl cellulose. In more detail, the protective film is generally prepared by casting and stretching triacetylcellulose. The film generally has Re of 0 to 200 nm, preferably 0 to 100 nm. The Re is defined as $\{(nx+ny)/2-nz\} \times d$ which is described in definition of that of the transparent support.

The optically anisotropic film having an optically negative uniaxial property and an optic axis in a direction inclined at 5 to 50 degrees from the normal of the film is incorporated into the liquid crystal display device in the form of the optical compensatory sheet. The optical compensatory sheet generally comprises the transparent support and the optically anisotropic film having an optically negative uniaxial property and an optic axis in the direction inclined at 5 to 50 degrees provided thereon. The optic axis in a direction is preferably inclined at 10 to 40 degrees from the normal, especially inclined at 20 to 35 degrees from the normal. Further, the optically anisotropic element preferably satisfies the condition of:

$$50 \leq \{(n_2+n_3)/2 - n_1\} \times d \leq 400 \text{ (nm)}$$

in which $n_1$, $n_2$ and $n_3$ are refractive indices in the three axes directions of the optically anisotropic film and $n_1$, $n_2$ and $n_3$ satisfies the condition of $n_1 < n_2 \approx n_3$.

Figure 5:
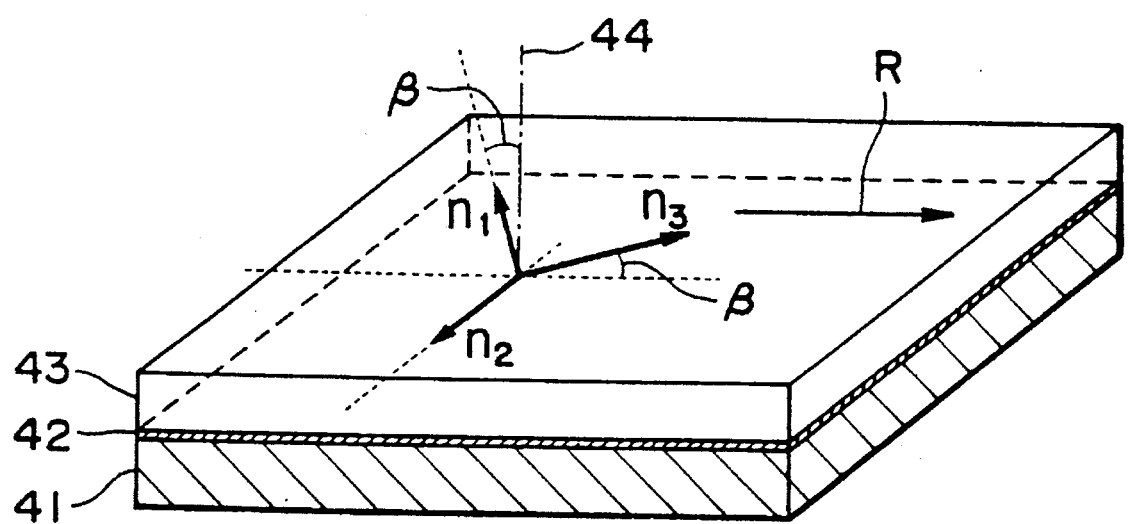
FIG. 5 is a view schematically showing the refractive indices of the three axes of the optical compensatory sheet of the invention.

The representative structure of the optically compensatory sheet employed in the invention is shown in FIG. 5. In FIG. 5, a transparent support 41, an orientation film 42 and an optically anisotropic film having an optically negative uniaxial property and an optic axis in the direction inclined at 5 to 50 degrees (e.g., a layer of compound having a discotic structure unit) 43 are superposed so as to constitute the optically compensatory sheet. The reference number R indicates the rubbing direction of the orientation film. The reference numbers $n_1$, $n_2$ and $n_3$ indicate refractive indices in the three axes direction of the optically anisotropic film, and $n_1$, $n_2$ and $n_3$ satisfy the condition of $n_1 \leq n_3 \leq n_2$, in the case that are seen in the front direction. The reference number β is an inclined angle of the optic axis to the normal 44 of the optically anisotropic film (having an optically negative uniaxial property and an optic axis in the direction inclined at 5 to 50 degrees).

Examples of the optically anisotropic film having the inclined optic axis include a layer of a compound having a discotic structure unit, a layer comprising an isomerized optical isomerizable compound, a squeezed film and a composite of two specific optical anisotropic layers, which are described below.

Examples of the compound having a discotic structure unit includes a discotic liquid crystalline compound having low molecular weight such as monomer and a polymer obtained by polymerization of a polymerizable discotic liquid crystalline compound. The discotic compounds are generally classified into a compound having discotic liquid crystalline phase (e.g., discotic nematic phase) and a compound having no discotic liquid crystalline phase.

The layer of the compound having a discotic structure (optically anisotropic film) is generally used in the form the optical compensatory sheet. The optical compensatory sheet is generally composed of a transparent support and the layer of the compound having a discotic structure (optically anisotropic film having an inclined optic axis) thereon, and it is preferred that an orientation layer is further provided between the support and the layer.

The optical compensatory sheet can be, for example, prepared in the following manner.

On the transparent support as mentioned above, the orientation layer is generally provided. The orientation layer has a function of defining an orientation direction of a discotic liquid crystalline compound to be provided thereon by a coating method, and the orientation gives an optic axis inclined from an optical compensatory sheet. As the orientation layers, any layers can be employed so long as they are capable of imparting orientation property to an layer of a compound having a discotic structure unit. Preferred examples of the orientation layer include a layer of an organic compound (preferably polymer) having been subjected to rubbing treatment, an obliquely deposited layer of an inorganic compound, and a layer having micro grooves.

Examples of material for the orientation layer include polymers such as polymethyl metacrylate, acrylic acid/methacrylic acid copolymer, styrene/maleinimide copolymer, polyvinyl alcohol, poly(N-methylolacrylamide), styrene/ vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate; and organic substances such as silane coupling agents.

Preferred examples of polymers for the orientation layer include polyimide, polystyrene, polymer of styrene derivatives, gelatin, polyvinyl alcohol and polyvinyl alcohol having an alkyl group (preferably having 6 or more carbon atoms). Orientation layers obtained by subjecting films of these polymers to the orientation treatment, are capable of tilting obliquely discotic liquid crystalline compound. Further, the glass plate treated with a silane coupling agent can be employed as the support having the orientation layer.

The polyvinyl alcohol having an alkyl group is especially preferred from the viewpoint of uniform orientation of the discotic liquid crystal. It is presumed that interaction between the alkyl chain on the orientation layer and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$HS)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.). Preferred examples of the polyvinyl alcohol having an alkyl group are those having one of the following structures:

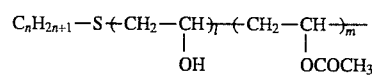

l: 80–90, m: 20–1, n: 8, 10, 12

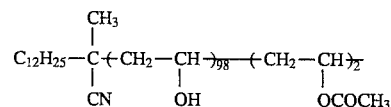

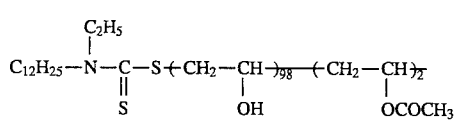

A polyimide film (preferably fluorine-containing polyimide film), which is widely used as an orientation layer for a liquid crystal cell, is also preferably employed as the orientation layer of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing the surface of the resultant polyimide film.

The orientation layer for the discotic liquid crystalline compound can be rubbed in the known manner which is conventionally employed to prepare an orientation layer or surface for liquid crystal of LCD. In more detail, the treatment is performed to give a function of orienting a liquid crystal to a surface of the orientation layer by rubbing the surface in a certain direction by the use of paper, gauze, felt, rubber, or fiber of polyamide or polyester. The rubbing procedure is generally performed by rubbing a surface of the orientation layer in several times using cloth.

As the orientation layer, an obliquely deposited layer of an inorganic compound is also employable. Examples of the inorganic compounds include metal oxides or metal fluorides such as SiO, TiO$_2$, MgF$_2$ and ZnO$_2$ and metals such as Au and Al. As the inorganic compounds, any compounds can be employed, so long as they have high dielectric constant (permittivity). The obliquely deposited layer of an inorganic compound can be prepared using the metallizing apparatus. The support may be metallized in the fixed condition, or the continuous support may be continuously metallized to give a continuous layer. In the case of using SiO$_2$ as the evaporation material, vapor deposition at a deposition angle of 65 to 88 degree gives an orientation film on which a discotic liquid crystal is uniformly oriented in the direction where the deposited particle column and the optic axis of the discotic liquid crystal almost intersect at right angle.

The layer of a compound having discotic structure unit (optically anisotropic film having an inclined optic axis) is formed on the orientation layer. In more detail, the layer generally comprises a discotic liquid crystalline compound or a polymer that a polymerizable discotic liquid crystalline compound is polymerized (cured). The optically anisotropic layer preferably comprises the polymer.

Examples of the discotic liquid crystalline compound employed in the invention include the following compounds:

Examples of the compounds include benzene derivatives described in C. Destrade et al., Mol. Cryst. vol. 71, pp. 111, 1981, truxene derivatives described in C. Destrade et al., Mol Cryst. vol. 122, pp. 141. 1985, Physics lett. A, vol. 78, pp. 82, 1980, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp.2655, 1994. The discotic liquid crystal generally has a structure that the above compound is located at a center of the crystal as a parent core and further straight chain groups such as alkyl, alkoxy and benzoyl having a substituent are radially bonded to the compound. As the discotic liquid crystals, any discotic liquid crystals can be used, so long as the liquid crystals have a negative birefringence (negative uniaxial property) and orientation property.

Preferred examples of the discotic liquid crystalline compounds employable in the invention are described below.
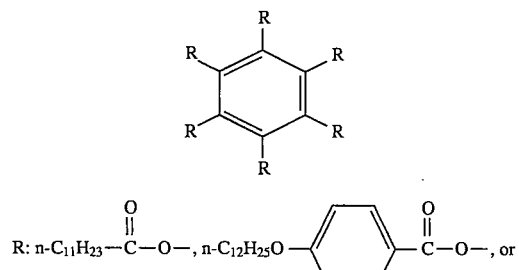
TE-1
R: n-$C_{11}H_{23}$—C(=O)—O—, n-$C_{12}H_{25}$O—C$_6$H$_4$—C(=O)—O—, or
n-$C_{12}H_{25}$O—C$_6$H$_4$—N=N—C$_6$H$_4$—C(=O)—O—
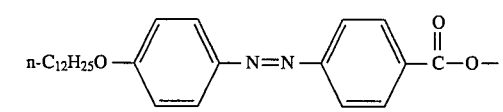
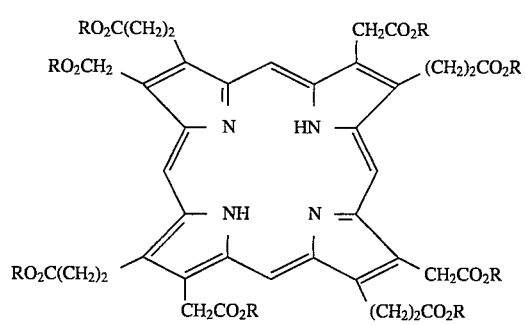
TE-2
R: n-$C_{12}H_{25}$—
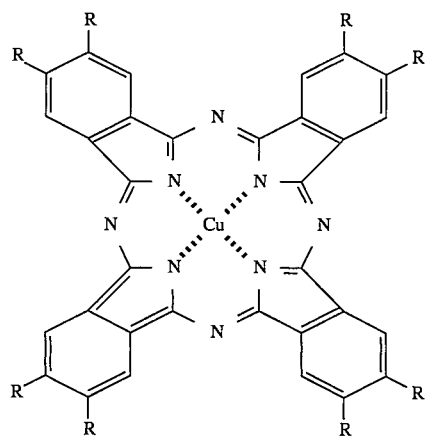
TE-3
R: n-$C_{12}H_{25}$OCH$_2$—
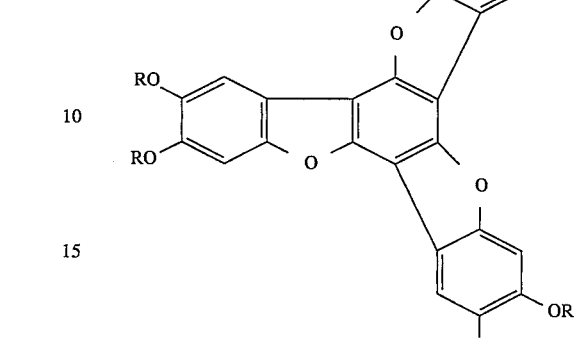
TE-4
R: n-$C_{12}H_{25}$O—C$_6$H$_4$—C(=O)—  or
n-$C_{13}H_{27}$CO—
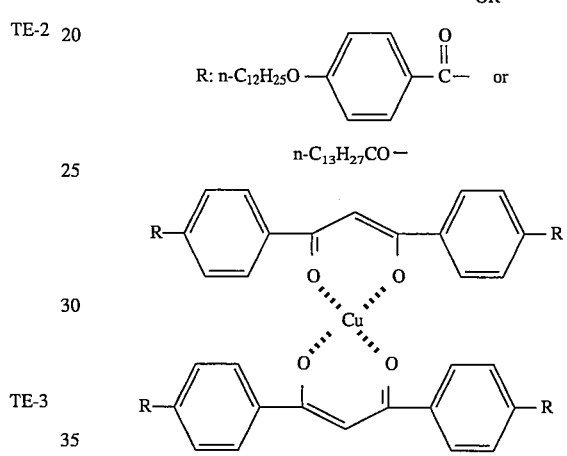
TE-5
R: n-$C_{10}H_{21}$—
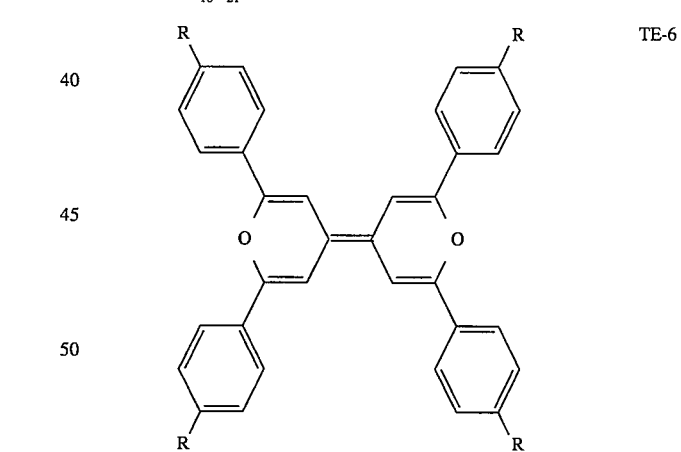
TE-6
R: n-$C_8H_{17}$—
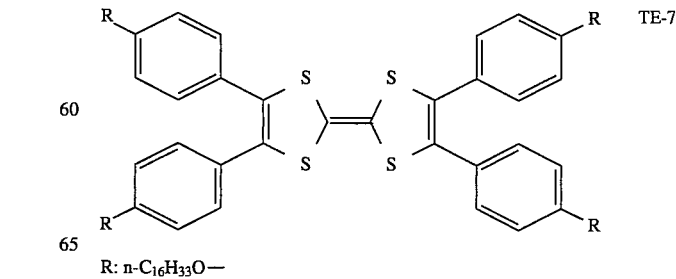
TE-7
R: n-$C_{16}H_{33}$O—

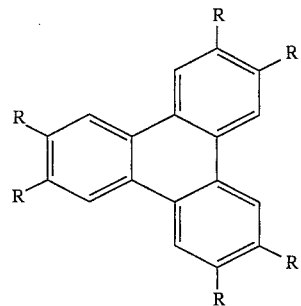

R:
(1) n-C$_m$H$_{2m+1}$O—  (m = an integer of 2–15), (2) n-C$_8$H$_{17}$—C(=O)—O—, (3) n-C$_8$H$_{17}$O—C$_6$H$_4$—C(=O)—O—, (4) n-C$_7$H$_{15}$O—C$_6$H$_4$—C(=O)—O—, (5) n-C$_5$H$_{11}$O—C$_6$H$_4$—C(=O)—O—, (6) n-C$_m$H$_{2m+1}$O—C$_6$H$_4$—CH=CH—C(=O)—O—

(m = an integer of 7–10), (7) CH$_2$(O)CH—C$_m$H$_{2m}$—O—C$_6$H$_4$—C(=O)—O—

(m = an integer of 4–10), or (8) CH$_2$=CH—C(=O)—O—C$_m$H$_{2m}$—O—C$_6$H$_4$—C(=O)—O—

(m = an integer of 4–10)

TE-8

TE-9

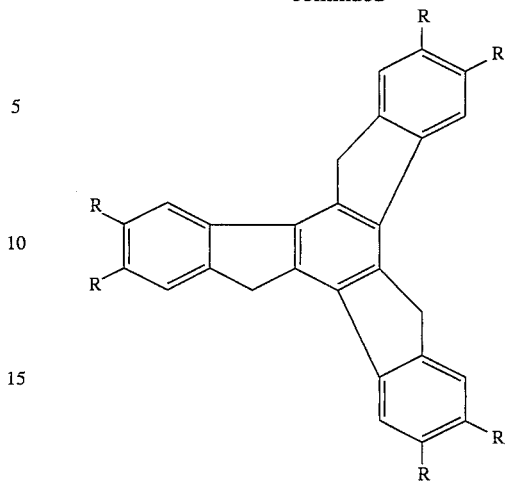

R:
(1) n-C$_{14}$H$_{29}$C(=O)—O—, (2) n-C$_{16}$H$_{33}$O—C$_6$H$_4$—C(=O)—O—, or (3) CH$_3$O—C$_6$H$_4$—NHCO(CH$_2$)$_8$C(=O)—O—

TE-10

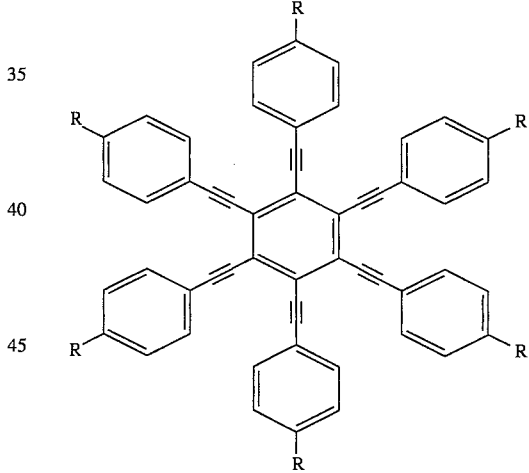

R: C$_7$H$_{15}$O—

TE-11

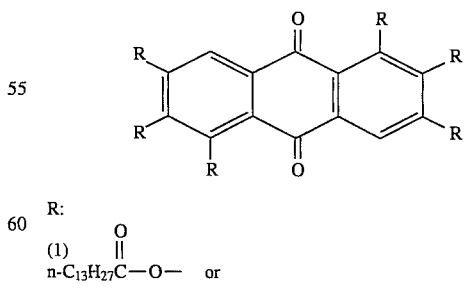

R:
(1) n-C$_{13}$H$_{27}$C(=O)—O—  or (2) 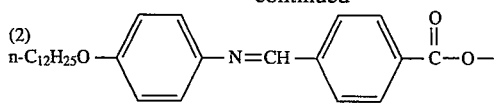

The layer of the compound having a discotic structure unit (optically anisotropic film having an inclined optic axis) can be generally prepared by coating a solution of the discotic compound in a solvent on the orientation layer, dried, heating to a temperature for forming a discotic nematic phase and cooling with keeping the oriented condition (discotic nematic phase). Otherwise, the layer can be prepared by coating a solution of a polymerizable discotic compound and other compound in a solvent on the orientation layer, dried, heating to a temperature for forming a discotic nematic phase, polymerizing the heated layer (e.g., by radiation of UV light) and cooling.

Although the temperature forming discotic nematic liquid crystal phase has an inherent value (temperature) of the discotic liquid crystalline compound, the temperature can be controlled within a desired range by mixing two or more kinds of discotic compounds and changing the mixing ratio. The temperature forming discotic nematic liquid crystal phase preferably is in the range of 70° to 300° C., and especially in the range of 70° to 150° C.

The solution for forming the layer of compound having a discotic structure unit is prepared by dissolving the discotic compound(s) in a solvent.

Examples of solvents employable for dissolving the compound therein, include polar solvents such as N,N-dimethylformamide (DMF), dimethyl sulfoxide (DMSO) and pyridine, nonpolar solvents such as benzene and hexane, alkyl halides such as chloroform and dichloromethane, esters such as methyl acetate and butyl acetate, ketones such as acetone and methyl ethyl ketone, and ethers such tetrahydrofuran and 1,2-dimethoxyethane. Preferred are alkyl halides and ketones. The solvents may be employed singly or in combination.

Examples of the method for coating the above solution thereof include curtain coating method, extrusion coating method, roll coating method, dip coating method, spin coating method, print coating method, coating method using slide coater and spray coating method. A vapor deposition method may be used, in the case of a mixture of discotic compounds only. In the invention, a continuously coating method is preferred. Therefore, coating methods such as curtain coating method, extrusion coating method, roll coating method and coating method using slide coater are preferred.

As mentioned above, the optical compensatory sheet can be prepared by coating the coating solution on the orientation layer, heating the coated solution to a temperature of not lower than glass transition temperature (further curing the layer by irradiation of UV light, if desired), and cooling the layer to room temperature.

Otherwise, the optically anisotropic film having an optically negative uniaxial property and an optic axis in a direction inclined at 5 to 50 degrees from the normal may be a squeezed film as set forth below.

The polymer employable for preparing the squeezed film preferably has a transmittance of not less than 70% and specially not less than 85%.

Examples of the above polymers include polycarbonate, polyallylate, polysulfone, polyether sulfone, polyethylene terephthalate, polyphenylene sulfide, polyphenylene oxide, polyallylsulfone, polyvinyl alcohol, polyamide, polyimide, polyolefin (e.g., ZEONEX 280 of Nippon Geon Co., Ltd.), polyvinyl chloride, cellulose derivatives (e.g., triacetyl cellulose), polyacrylonitrile, polystyrene and polymethyl methacrylate. The above polymer may be a homopolymer, a copolymer, a derivative thereof or a blended composition comprising two or more kinds of the polymers.

The squeezed film can be, for example, prepared using the above polymer in the following manner.

Figure 6:
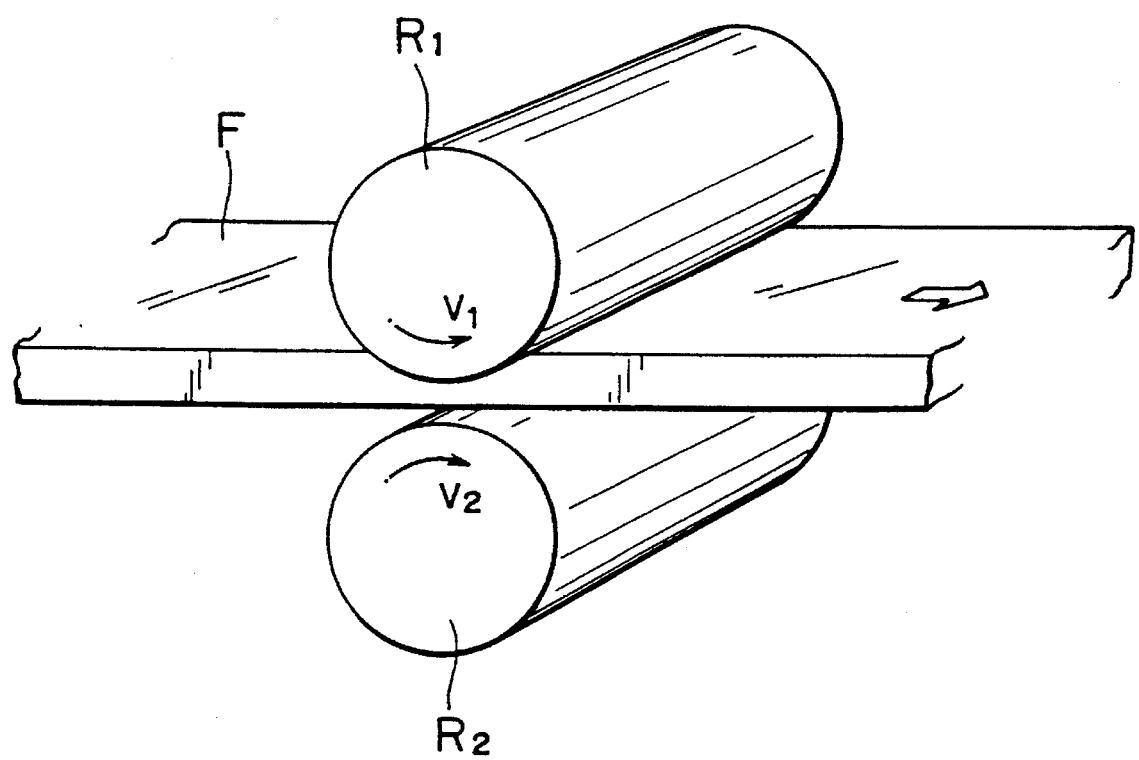
FIG. 6 is a view schematically showing the process for preparation of the squeezed film.

The process for squeezing a film can be performed according to the process shown in FIG. 6. A polymer solution is casted on support to form a film, and the polymer film is rolled by passing between two pressure rollers $R_1$ (speed: $V_1$) and $R_2$ (speed: $V_2$; $V_1 > V_1$) having peripheral speed different from each other (whereby nz is inclined), and stretched in the width direction to prepare a squeezed film. Before the polymer film is rolled, the film may be stretched in the width direction. In this case, after the polymer film is rolled, the squeezed film may be stretched in the longitudinal direction. To obtain the squeezed film, the peripheral speed ratio and the stretching ratio are appropriately varied depending upon nature of used polymer.

Further, the optically anisotropic film having an optically negative uniaxial property and an optic axis in a direction inclined at 5 to 50 degrees from the normal of the film can be also prepared using optical isomerizable substance. The optical isomerizable substance means one that can be converted into streoisomer or structural isomer by means of a light. The optical isomerizable substance preferably is one that can be reversely isomerized (i.e., returned to the original substance) by means of a light having wavelength different from that used in the above isomerization or by application of heat. Examples of the optical isomerizable substance employed in the invention include azobenzene compounds, benzaldoxime compounds, azomethine compounds, fulgide compounds, diarylester compounds, cinnamic acid derivatives, retinal compounds and hemithioindigo compounds. Most of these compounds are known as photochromic compounds. The optical isomerizable substance further includes polymers having groups derived from the above compounds or derivatives. The polymers may have an optical isomerization group on the main chain or the side chain.

Representative examples of structure or structure unit of the optical isomerizable substances are as follows:

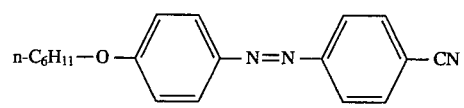 OIS-1

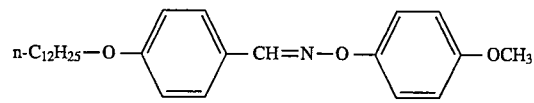 OIS-2

-continued
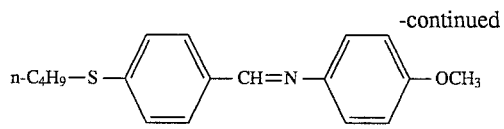 OIS-3
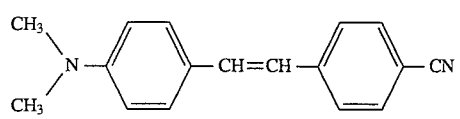 OIS-4
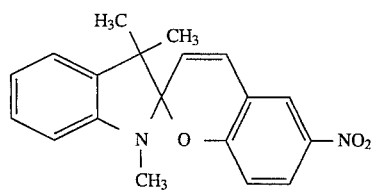 OIS-5
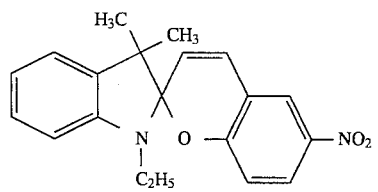 OIS-6
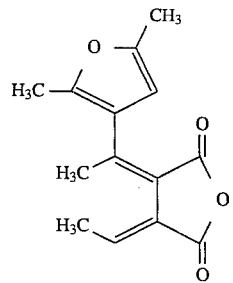 OIS-7
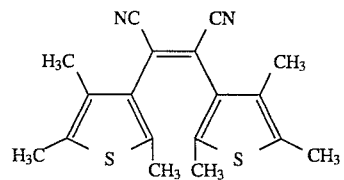 OIS-8
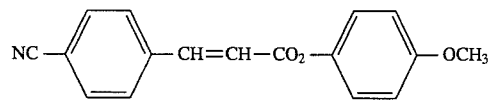 OIS-9
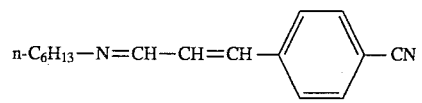 OIS-10
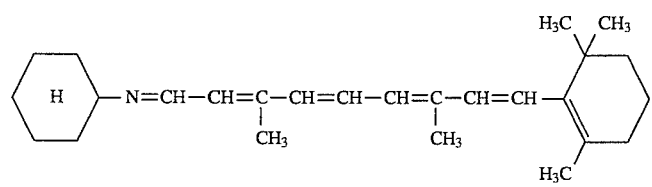 OIS-11
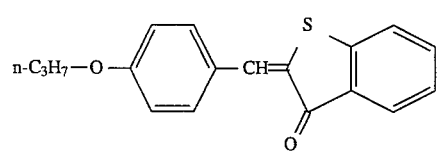 OIS-12

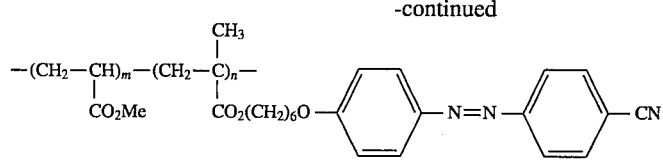  OIS-13
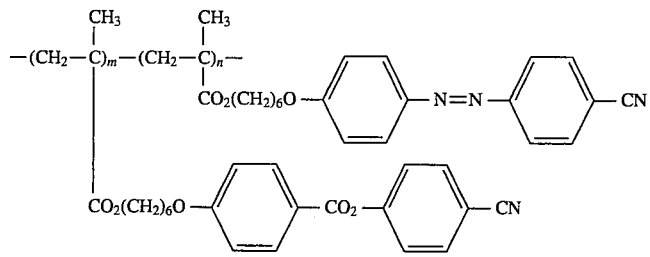  OIS-14
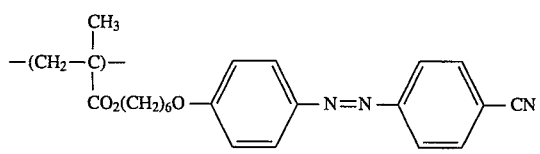  OIS-15
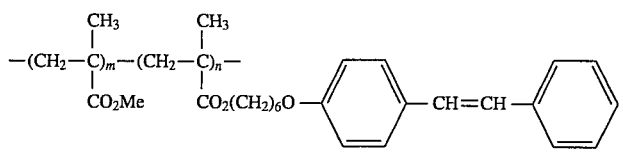  OIS-16
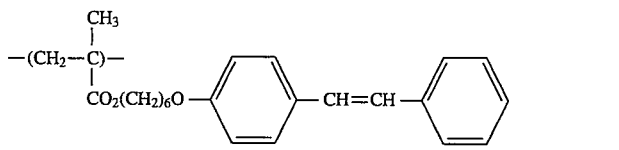  OIS-17
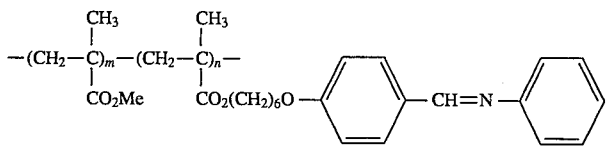  OIS-18
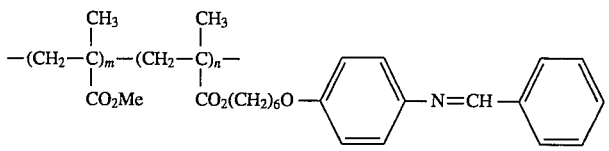  OIS-19
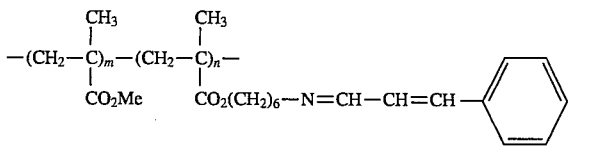  OIS-20
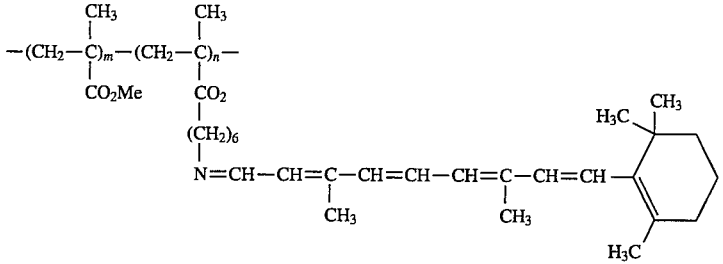  OIS-21
The above "m" and "n" are arbitrary values provided that the sum of m and n is 100 molar %.
Furthermore, the optical anisotropic film having an optically negative uniaxial property and an optic axis in a direction inclined at 5 to 50 degrees from the normal may be a composite of two specific optically anisotropic layers.

The composite comprises an optically anisotropic layer having an optically positive uniaxial property and an optic axis in a direction inclined from the normal of the layer and an optically anisotropic layer having the minimum of main refractictive indices in the thickness direction and the maximum of main refractictive indices on a plane of the layer. The two layers are arranged in such a manner that a direction given when the direction inclined from the normal of the former layer is orthographically projected on the layer is perpendicular to the direction of the maximum main refractive index of the latter layer.

In more detail, the optically anisotropic layer having an optically positive uniaxial property and an inclined optic axis can be prepared by forming an orientation layer such as a rubbed polymer layer or an obliquely deposited layer of an inorganic compound on a transparent film (e.g., glass plate), and coating a solution containing a nematic liquid crystal on the orientation layer. On the other hand, the optically anisotropic layer having the minimum of main refractictive indices in the thickness direction and the maximum of main refractictive indices on a plane of the layer can be prepared by monoaxially stretching polymer film having positive inherent birefringence. These layers may be bonded to prepare the composite. Otherwise, the composite can be advantageously prepared by forming the orientation layer on the monoaxially stretched polymer film and coating a solution containing nematic liquid crystal on the orientation layer.

As the nematic liquid crystal, liquid crystalline compounds having a functional group (especially capable of forming cross-linkage) showing nematic phase can be employed as well as conventional liquid crystalline compounds showing nematic phase.

The reason why the optical compensatory sheet employed in the invention gives much increase of the viewing angle is assumed as follows:

Most of TN-LCD adopt normally white mode. In the mode, a light transmittance in a black display portion extremely increases with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal line to a surface of the cell.

In the case that an optic axis of the TN-type liquid crystal cell is inclined from the normal of the cell, use of a optically anisotropic substance having an optic axis in the direction of the normal is considered not to appropriately compensate the phase difference by the cell. In other words, an optically anisotropic substance is needed for the cell to have an optic axis inclined from the normal. Further, when the cell is regarded as a composite of optically anisotropic substances with a positive uniaxial property, an optically anisotropic substance having an optically negative uniaxial property is suitably used for compensating phase difference by the cell. Thus, use of an optically anisotropic substance of an optically negative uniaxial property having optic axis inclined from the normal improves viewing angle characteristics. However, it is mere approximation that the liquid crystal cell behaves as optically anisotropic substance with a positive uniaxial property having optic axis inclined from the normal line. Therefore, use of the optically anisotropic substance does not give satisfactorily compensation of phase difference.

From study of the inventors, it has been discovered that the TN-type liquid crystal cell can be regarded as a composite of two optically anisotropic substances having a positive uniaxial property which has a inclined angle equal to each other and inclination direction differing from each other. When an intermediate gradation is displayed, optic axes of the optically anisotropic substances are further inclined from the normal of the cell.

In the case that the TN-type liquid crystal cell is considered as above, improvement of viewing angle characteristics can be obtained by employing the optical compensatory sheet which is prepared by, for example, superposing an optically anisotropic element having an optically negative uniaxial property and an inclined optic axis inclined at 5 to 50 degree to the normal, on an optically anisotropic element having an optically negative uniaxial and an optic axis in a direction of the normal.

Figure 7:
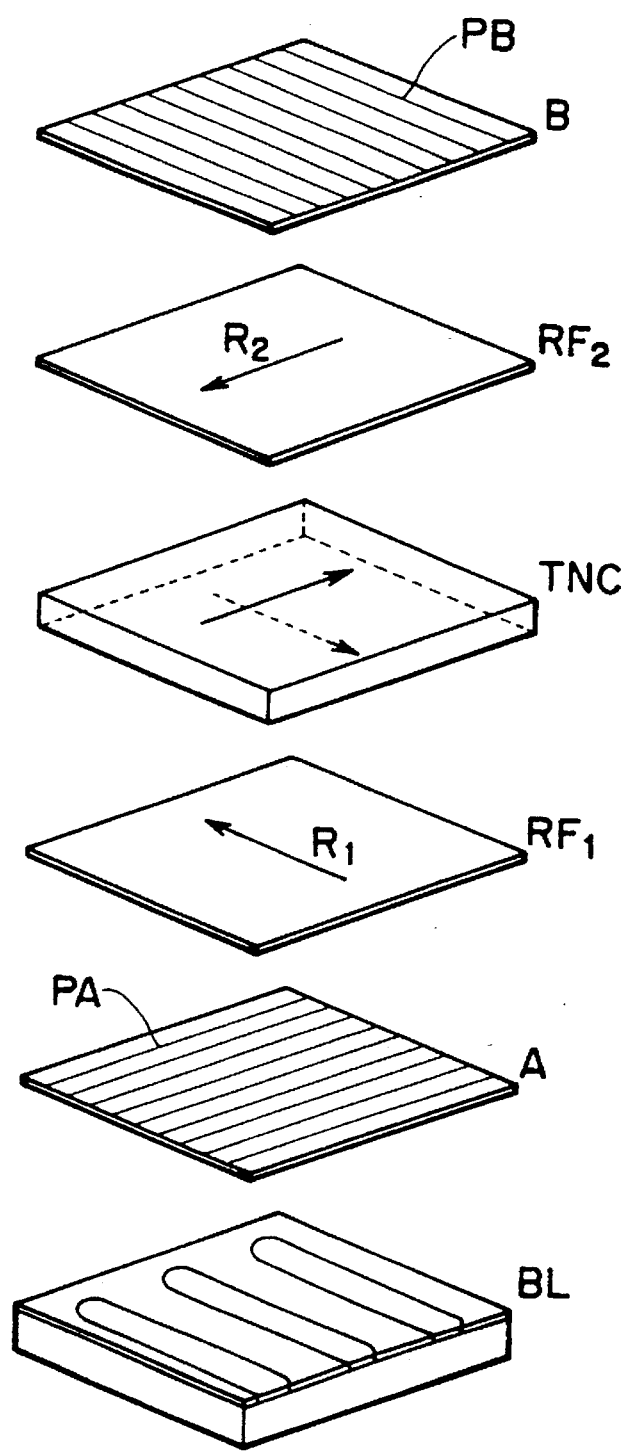
FIG. 7 is a view schematically showing a structure of the liquid crystal display device of the invention indicating preferred arrangement of the optical compensatory sheet and the liquid crystal cell.

The representative structure of the liquid crystal display device of the invention indicating preferred arrangement of the optical compensatory sheet and the liquid crystal cell is shown in FIG. 7. In FIG. 7, a liquid crystal cell TNC comprising a pair of substrates provided with a transparent electrode and a twist-oriented nematic liquid crystal sealed therebetween, a pair of polarizing plates A and B arranged on the both sides of the cell, the optical compensatory sheets RF1 and RF2 between the liquid crystal cell and the polarizing sheet and back light BL are assembled to constitute the liquid crystal display. The reference number R1 is a rubbing direction of the orientation layer of the optical compensatory sheet RF1, and the reference number R2 is the rubbing direction of the orientation layer of the optical compensatory sheet RF2, in the case that are seen in the front direction. An arrow of a solid line of the liquid crystal cell TNC indicates the rubbing direction of the polarizing sheet B side substrate of TNC, and an arrow of a dotted line of the liquid crystal cell TNC indicates the rubbing direction of the polarizing sheet A side substrate of TNC. PA and PB are polarizing axes of polarizing sheets A and B, respectively.

Examples of the present invention and comparison examples are given below, but these examples by no means restrict the invention.

EXAMPLE 1

Preparation of transparent supports (NF-1 to NF-3; optically anisotropic film having an optic axis in the direction of the normal)

Triacetyl cellulose (weight-average molecular weight: 130,000, in terms of polystyrene) was dissolved in dichloromethane to prepare a polymer solution. The polymer solution was casted on a metal belt and peeled off to prepare a film. Then, the film was stretched in the widthwise direction using a tenter and in the lengthwise (MD) direction and subjected to orientation relaxation by heating. Thus, triacetyl cellulose films having various planar orientation (NF-1 to NF-3) were prepared.

Figure 4:
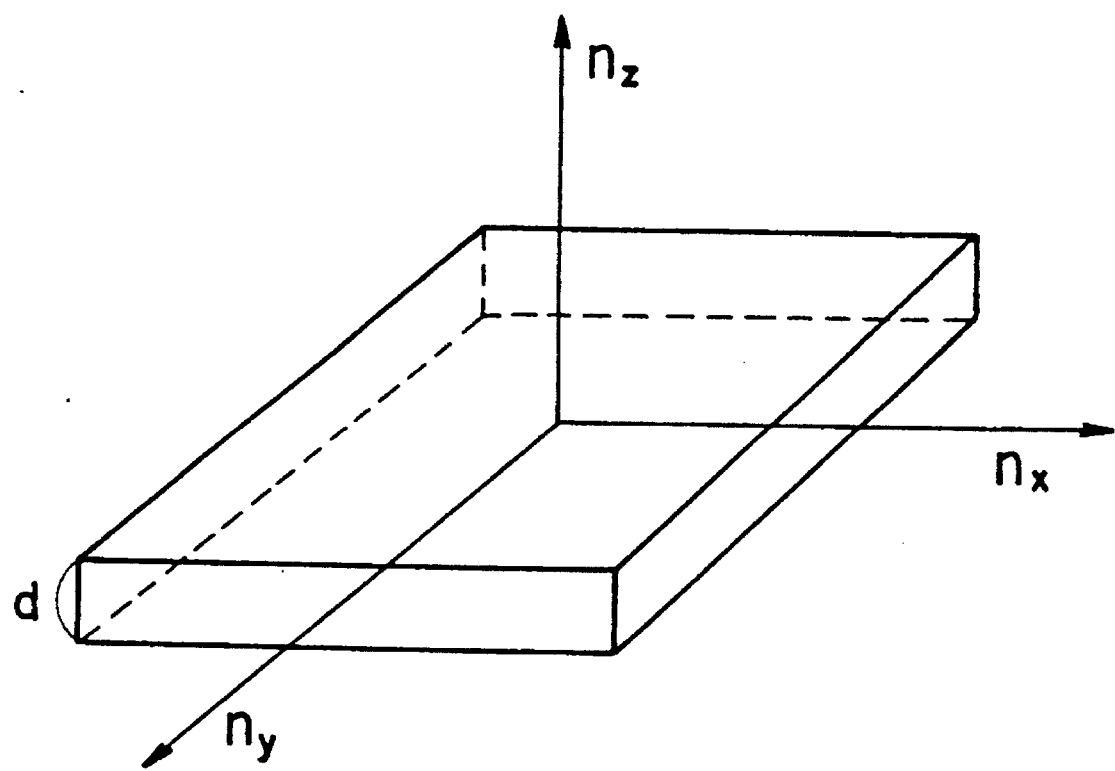
FIG. 4 is a view schematically showing the refractive indices of the three axes of the transparent support or the protective film of the invention.

"$(n_x-n_y) \times d$" and "$\{(n_x+n_y)/2-n_z\} \times d$" of the prepared films were determined, in which $n_x$ and $n_y$ is the main refractictive indices within the film, $n_z$ is the main refractive index in a thickness direction, and d is the thickness of the film (FIG. 4).

The thickness was measured with a micrometer, Re value in the normal direction was measured by an ellipsometer (AEP-100, available from Shimadzu Seisakusho, Ltd.) to regard the value as "$(n_x-n_y) \times d$", and "$\{(n_x+n_y)/2-n_z\} \times d$" was determined by measuring "$n_y$" with Abbe refractometer and calculating "$\{(n_x+n_y)/2-n_z\} \times d$" using the value of "$n_y$"

and "nz" calculated from Re values measured at various angles.

The obtained results were set forth in Table 1.

TABLE 1

| Support | Thickness [d] (μm) | (nx − ny) × d (nm) | {(nx + ny)/2 − nz} × d (nm) |
|---|---|---|---|
| NF-1 | 80 | 3 | 32 |
| NF-2 | 83 | 4 | 53 |
| NF-3 | 85 | 7 | 78 |

The results of Table 1 show that each of the films (NF-1 to NF-3) satisfies the condition of nx≈ny>nz. Accordingly, it is apparent that these films show optically negative uniaxial property.

Preparation of optical compensatory sheet (NIF-1)

On the triacetyl cellulose film (NF-1 mentioned as above), a thin layer of gelatin (0.1 μ/n) was formed. A coating solution containing polyvinyl alcohol having long chain alkyl groups (MP-203, produced by Kuraray Co., Ltd.) was coated on the gelatin layer, dried using warm air to form a layer of the polyvinyl alcohol and rubbing a surface of the layer to form an orientation layer.

On the orientation film, a coating solution of 12 wt. % obtained by dissolving a mixture of the discotic liquid crystal TE-8-(3) and the discotic liquid crystal TE-8-(5) (compounds previously mentioned; mixed ratio: TE-8-(3):TE-8-(5)=5:1, by weight) in methyl ethyl ketone was coated at 2,000 rpm using a spin-coater. Thereafter, the coated layer was heated to 145° C. for heat treatment, and cooled to room temperature to form a layer of a compound having discotic structure unit (optically anisotropic film having an optic axis in the direction of the normal) having the thickness of 1.2 μm. Thus, an optical compensatory sheet (NIF-1) was obtained.

COMPARISON EXAMPLE 1

Preparation of optically anisotropic film having an optic axis in a direction inclined at 5 to 50 degrees from the normal (IF-1)

On a glass plate (thickness: 1 mm) showing optically isotropy, the same orientation layer and the layer of a compound having discotic structure unit was formed in the same manner as in Example 1 (NIF-1). Thus, an optically anisotropic film (IF-1) was obtained.

EXAMPLE 2

Preparation of optical compensatory sheet (NIF-2)

On the triacetyl cellulose film (NF-3 of Example 1), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air to form a layer of the polyvinyl alcohol and rubbing a surface of the layer to form an orientation layer.

On the orientation film, a coating solution of 7 wt. % obtained by dissolving the discotic liquid crystal TE-8-(7)-(m=6) (compound previously mentioned) and a polymerization photoinitiator (Michler's ketone:benzophenone=1:1 (by weight), 1 wt. % based on the weight of TE-8-(7)-(m=6)) in methyl ethyl ketone was coated at 2,000 rpm using a spincoater. Thereafter, the coated layer was heated to 145° C. for heat treatment, and cooled to room temperature to form a layer of a compound having discotic structure unit (optically anisotropic film having an optic axis in a direction inclined at 5 to 50 degrees from the normal) having the thickness of 1.2 μm. Thus, an optical compensatory sheet (NIF-2) was obtained.

COMPARISON EXAMPLE 2

Preparation of optically anistropic film having an optic axis in a direction inclined at 5 to 50 degrees from the normal (IF-2)

On a glass plate (thickness: 1 mm) showing optically isotropy, the same orientation layer and the layer of a compound having discotic structure unit was formed in the same manner as in Example 2 (NIF-2). Thus, an optical anisotropic film (IF-2) was obtained.

EXAMPLE 3

Preparation of squeezed film (IF-3; optically anisotropic film having an optic axis in a direction inclined at 5 to 50 degrees from the normal)

A polycarbonate film (width: 30 cm, thickness: 50 μm) was rolled by passing between two pressure rollers $R_1$ (speed: $V_1$) and $R_2$ (speed: $V_2$) having peripheral speed different from each other as shown FIG. 5, under the following conditions.

Peripheral speed ($V_1$) of roller $R_1$: 1.005 m/min.

Peripheral speed ($V_2$) of roller $R_2$: 1.000 m/min.

Temperature of roller $R_1$: 138° C.

Temperature of roller $R_2$: 138° C.

Force given between two rollers: 3,000 kg

Diameter of roller $R_1$: 15 cm

Diameter of roller $R_2$: 15 cm

Subsequently, the resultant film was stretched by 6% in the width direction at 160° C. to prepare a squeezed film (IF-3).

Preparation of optical compensatory sheet (NIF-3)

Then, the squeezed film (IF-3) was bonded to the triacetyl cellulose film (NF-1 of Example 1) using a pressure-sensitive adhesive of acrylic polymer to prepare a composite (optical compensatory sheet (NIF-3)).

EXAMPLE 4

Preparation of composite of glass plate and layer of optical isomerizable compound (IF-4; optically anisotropic film having an optic axis in a direction inclined at 5 to 50 degrees from the normal)

On a glass plate (thickness: 1 mm) showing optically isotropy, a coating solution of 20 wt. % obtained by dissolving the optically isomerizable compound OIS-13 (m:n= 50:50 (molar ratio), compound previously mentioned) in dichloromethane was coated at 2,000 rpm using a spincoater. Thereafter, a polarized light of a xenon lamp was irradiated on the coated layer from the direction inclined at 33 degrees from the normal of the glass plate. The irradiation was performed under the conditions of luminance of 20,000 lux, a temperature of 40° C. and a period of 30 min. Thus, a composite of a glass plate and a layer of optical isomerizable compound (IF-4) was prepared.

Preparation of optical compensatory sheet (NIF-4)

Then, the composite having a layer of optical isomerizable compound (IF-4) was bonded to the triacetyl cellulose film (NF-2 of Example 1) using a pressure-sensitive adhesive of acrylic polymer to prepare a composite (optical compensatory sheet (NIF-4)).

EXAMPLE 5

Preparation of composite of two specific optically anisotropic layers (IF-5; optically anisotropic film having an optic axis in a direction inclined at 5 to 50 degrees from the normal)

A polycarbonate film (width: 50 cm, thickness: 80 μm) was stretched by 5% in the width direction at 170° C. to prepare a stretched film.

On the stretched film, SiO was obliquely deposited using a continuous metallizing apparatus from a direction inclined by 40 degrees from the normal of the film to the lengthwise (MID) direction of the film (i.e., direction perpendicular to the stretched direction).

On the orientation layer, a coating solution of 1 wt. % obtained by dissolving a nematic liquid crystal (MBBA, available from Merck & Co.) in dichloromethane was coated. Thereafter, the coated layer was heated to 70° C. for heat treatment and cooled to room temperature to form a nematic liquid crystal layer having the thickness of 0.7 μm.

Then, a triacetylcellulose film was laminated on the nematic liquid crystal layer to prepare a composite of two specific optically anisotropic layers (IF-5)

Preparation of optical compensatory sheet (NIF-5)

Then, the composite having a layer of optical isomerizable compound (IF-5) was bonded to the triacetyl cellulose film (NF-3 of Example 1) using a pressure-sensitive adhesive of acrylic polymer to prepare a composite (optical compensatory sheet (NIF-5)).

[Evaluation of optically anisotropic film]

As for the optically anisotropic films having an optically negative uniaxial property and an optic axis in a direction inclined at 5 to 50 degrees from the normal (IF-1 to IF-5) obtained in Comparison Examples 1 and 2 and Examples 3 to 5, the optical characteristics were evaluated in the manners described below.

As to the films, the thickness was measured with a micrometer, and Re values in various directions were measured by an ellipsometer (AEP-100, available from Shimadzu Seisakusho, Ltd.). Using Re values measured at various angles, $\{(n_2+n_3)/2-n_1\} \times d$ ($n_2$, $n_3$, $n_1$ and d have the same meanings as defined in FIG. 5) and angle (β) between an optic axis and the normal of the film, were calculated. The measurement was conducted using the ellipsometer in transmission mode.

The obtained results are set forth in Table 2.

TABLE 2

| Element | Δn · d (nm) | β (degree) |
|---------|-------------|------------|
| IF-1    | 180         | 22         |
| IF-2    | 120         | 35         |
| IF-3    | 125         | 28         |
| IF-4    | 105         | 20         |
| IF-5    | 176         | 38         |

Note:
Δn · d: $\{(n_2 + n_3)/2 - n_1\} \times d$

EXAMPLES 6–10 and COMPARISON EXAMPLES 3–7

Preparation of liquid crystal display device

Two optical compensatory sheets obtained Example 1 were attached to both sides of TN-type liquid crystal cell that the clearance between the substrates of the liquid crystal cell was 450 nm, and the twisted angle of the liquid crystal was 90 degrees (FIG. 2). Further, a pair of polarizing plates comprising a polarizer and triacetylcellulose film were attached on both sides of the cell (i.e., on the optical compensatory sheet and a surface having no sheet of the cell) (FIG. 2). The triacetylcellulose film had an optically negative uniaxial and an optic axis in a direction of the normal, and $\{(nx+ny)/2-nz\} \times d$ of 45 nm.

The relationship of polarizing axes of the polarizing plates, rubbing directions of the cell and rubbing directions of the sheet were shown in FIG. 6.

The obtained TN-LCD is normally white mode type and has a structure shown in FIG. 2.

The optical compensatory sheets (NIF-2 to NIF-5) obtained Examples 2–5 and the triacetylcellulose films (NF1 to NF-3) of Example 1 and IF-1 and IF-2 of Comparison Examples 1 and 2 were also attached to TN-type liquid crystal cell in the same manner as above.

Further, the TN-LCD having no optical compensatory sheet (Comparison Example 8) was evaluated in the same manner as above.

[Evaluation of liquid crystal display]

To the TN-LCD, a rectangular wave of 40 Hz was applied at a voltage of 0 to 5 V, and transmittances (T) were measured by varying the viewing angle using a spectrophotometer (LCD-5000, available from Otsuka Electronics Co., Ltd.). From the measured data, the angle against the normal at which the contrast ($T_{1V}/T_{5V}$) on a black-and-white display showed 10 was defined as viewing angle and the viewing angles in the height (upper-lower) direction and the width (left-right) direction of the TN-LCD were determined.

The obtained results are set forth in Table 3.

TABLE 3

| Example   | Sheet (Film) | Sum of Re (nm) | *Re of inclined angle (nm) | Optic angle (β) (degree) | Viewing Angle upper-lower (degree) | Viewing Angle left-right (degree) |
|-----------|--------------|----------------|----------------------------|--------------------------|-----------------------------------|----------------------------------|
| Ex. 6     | NIF-1        | 154            | 180                        | 22                       | 125                               | 120                              |
| Ex. 7     | NIF-2        | 246            | 120                        | 35                       | 120                               | 118                              |
| Ex. 8     | NIF-3        | 154            | 125                        | 28                       | 120                               | >120                             |
| Ex. 9     | NIF-4        | 196            | 90                         | 20                       | 115                               | >120                             |
| Ex. 10    | NIF-5        | 246            | 176                        | 38                       | 105                               | 92                               |
| Co. Ex. 3 | NF-1         | 154            | 0                          | —                        | 47                                | 87                               |
| Co. Ex. 4 | NF-2         | 196            | 0                          | —                        | 42                                | 81                               |
| Co. Ex. 5 | NF-3         | 246            | 0                          | —                        | 40                                | 75                               |
| Co. Ex. 6 | IF-1         | 0              | 180                        | 22                       | 75                                | 100                              |
| Co. Ex. 7 | IF-2         | 0              | 120                        | 35                       | 73                                | 95                               |
| Co. Ex. 8 | —            | 0              | 0                          | —                        | 53                                | 70                               |

Note;
*: Re of optically anisotropic film having inclined angle (Δn · d of Table 2)

As is apparent from results of Table 3, the liquid crystal display devices (Examples 6–10) which are provided with the optical compensatory sheets (Examples 1–5) and the protective films and have the sum of Re values (Re=$\{(nx+ny)/2-nz\} \times d$) in the specific range, showed greatly enlarged viewing angle.

What is claimed is:

1. A liquid crystal display device comprising a liquid crystal cell which comprises a pair of substrates provided with a transparent electrode and twist nematic liquid crystal sealed therebetween, a pair of polarizing plates arranged on both sides of the cell each of which comprises a polarizer and a pair of protective films provided both sides of the polarizer, and an optical compensatory sheet between the cell and the polarizing plate which is provided on one side or both sides of the cell;

wherein said optical compensatory sheet comprises at least two optically anisotropic films having optically negative uniaxial property, one film having an optic axis in the direction of the normal of the film and other film having an optic axis in a direction inclined at 5 to 50 degrees from the normal, and the sum of Re value of the film having an optic axis in the direction of the normal and Re values of two protective films existing between the polarizers is in the range of 100 to 400 nm, said Re value being defined by the formula:

$$Re=\{(nx+ny)/2-nz\}\times d$$

in which nx and ny are main refractictive indices on the plane and nz is a main refractive index in the thickness direction of the film.

2. The liquid crystal display device as defined in claim 1, wherein said optical compensatory sheet is provided on both sides of the cell.

3. The liquid crystal display device as defined in claim 1, wherein the optically anisotropic film having an optic axis in a direction inclined at 5 to 50 degrees from the normal comprises a compound having a discotic structure unit.

4. The liquid crystal display device as defined in claim 1, wherein the optically anisotropic film having an optic axis in a direction inclined at 5 to 50 degrees from the normal is prepared by casting a polymer solution on support to form a film, and giving shearing stress between both sides of the film.

5. The liquid crystal display device as defined in claim 1, wherein the optically anisotropic film having an optic axis in a direction inclined at 5 to 50 degrees from the normal comprises an optical isomerizable compound.

6. The liquid crystal display device as defined in claim 1, wherein the optically anisotropic film having an optic axis in a direction inclined at 5 to 50 degrees from the normal comprises an optically anisotropic layer having a positive uniaxial property and an optic axis in a direction inclined from the normal and an optically anisotropic layer having the minimum of main refractictive indices in a thickness direction and the maximum of main refractictive indices on a plane of the layer, said two optically anisotropic sheets being arranged under the condition that the direction given when the direction inclined from the normal of the former anisotropic layer is orthographically projected on the layer is perpendicular to the direction of the maximum main refractive index of the latter anisotropic layer.

7. The liquid crystal display device as defined in claim 1, wherein the protective film comprises triacetyl-cellulose.

\* \* \* \* \*